United States Patent Office 3,763,145
Patented Oct. 2, 1973

3,763,145
HALOGENOSTEROIDS
Georg Anner, Basel, and Peter Wieland, Oberwil, Switzerland, assignors to Ciba-Geigy Corporation, Ardsley, N.Y.
No Drawing. Filed Apr. 13, 1971, Ser. No. 133,699
Claims priority, application Switzerland, Apr. 17, 1970, 5,792/70, 5,795/70
Int. Cl. C07c 173/00
U.S. Cl. 260—239.55 D
10 Claims

ABSTRACT OF THE DISCLOSURE 21-fluoro-steroids derivatives of $\Delta^6$-6-fluoro or 6-chloro-progesterone oxygenated in 16- and 17-position have antiinflammatory, gestagenic and antiovulatory activity. The compounds can be prepared in a manner known per se. The corresponding derivatives nonhalogenated in 6-position are also antiinflammatory and gestagenic agents.

---

The present invention relates to the manufacture of new halogenosteroids of the pregnane series, and especially those of formula

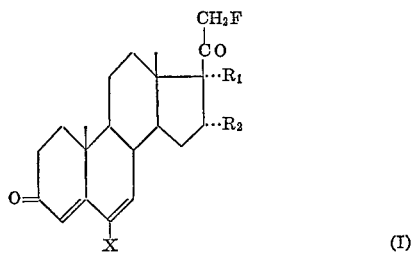

(I)

wherein $R_1$ and $R_2$ each denote a free, esterified or etherified hydroxyl group and $R_1$ together with $R_2$ denotes the group

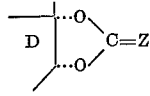

wherein Z denotes two aliphatic, aromatic or araliphatic hydrocarbon radicals or the group $>C=Z$ denotes a cycloalkylidene group and X represents a fluorine or chlorine atom, as well as their 1-dehydro derivatives.

The esterified hydroxyl groups mentioned are especially derived from saturated or unsaturated carboxylic acids of the aliphatic, aromatic or heterocyclic series, especially from those with 1–18 carbon atoms, for example formic acid, acetic acid, propionic acid, the butyric acids, valeric acids, such as n-valeric acid, or trimethylacetic acid, trifluoracetic acid, the caproic acids, such as β-trimethyl-propionic acid or diethylacetic acid, oenanthic, caprylic, pelargonic, capric and undecylic acids, for example undecylenic acid, lauric, myristic, palmitic or stearic acids, for example oleic acid, or a cyclopropanecarboxylic, cyclobutanecarboxylic, cyclopentanecarboxylic and cyclohexanecarboxylic acid, for example cyclopropylmethanecarboxylic acid, cyclobutylmethanecarboxylic acid, cyclopentylethanecarboxylic acid, cyclohexylethanecarboxylic acid, benzoic acid, from phenoxyalkane-acid, such as phenoxyacetic acid, from dicarboxylic acids, such as succinic acid, phthalic acid, quinolinic acid, furane-2-carboxylic acid, 5-tert.-butyl-furane-2-carboxylic acid, 5-bromo-furane-2-carboxylic acid, 5-bromo-furane-carboxylic acid, nicotinic acid or isonicotinic acid, or from sulphonic acids, such as benzenesulphonic acids, or from inorganic acids, such as for example phosphoric or sulphonic acids.

An etherified hydroxyl group is especially a group of this kind which is derived from alcohols with 1–8 carbon atoms for example from lower aliphatic alkanols, such as ethyl alcohol, methyl alcohol, propyl alcohol, isopropyl alcohol, the butyl or amyl alcohols or from araliphatic alcohols, especially from monocyclic aryl-lower aliphatic alcohols, such as benzyl alcohol, or from heterocyclic alcohols such as α-tetrahydropyranol or α-tetrahydrofuranol.

The two hydrocarbon radicals of the group Z can be identical or different, saturated or unsaturated, straight-chain or branched, and are preferably lower alkyl, such as methyl, ethyl, propyl, isopropyl, butyl or tert.-butyl, phenyl, tolyl or xylyl groups, the benzyl group or the phenylethyl group. The cycloalkylidene group C=Z is especially a group derived from 5-membered or 6-membered cycloaliphatic ketones, such as cyclopentanone or cyclohexanone, that is to say a cyclopentylidene or cyclohexylidene group, or their derivatives which are unsaturated and/or substituted by alkyl groups, for example methyl groups.

Of the new compounds, there should especially be mentioned $\Delta^{4,6}$-6,21 - difluoro - 16α,17α - dihydroxy-3,20-dioxopregnadiene and $\Delta^{4,6}$-6-chloro - 21 - fluoro-16α,17α-dihydroxy-3,20-dioxo-pregnadiene and their 16- or 17-esters of lower aliphatic carboxylic acids, for example acetic acid, propionic acid, trimethylacetic acid, valeric acid or caproic acid, or corresponding 16,17-diesters, their 16- or 17-monoethers derived from lower aliphatic alcohols or the corresponding 16,17-diethers and especially their 16,17-acetonides and 16,17-ketals of cyclopentanone and cyclohexanone, as well as the 1-dehydro derivatives of these compounds.

The new compounds of the present application possess valuable pharmacological properties. This, in addition to displaying a gestagenic and ovulation-inhibiting action, they especially display a pronounced anti-inflammation action both on systemic administration and on local application, as can be shown in animal experiments. When administered perorally, the compounds are effective in the crude wadding granuloma test on male rats even at doses of only about 0.03 mg./kg., and applied locally, in the same test, at doses of 0.001 mg. per animal. A progestative effect in the Clauberg test on rabbits manifests itself on subcutaneous administration already at doses of about 0.003, and the inhibition of ovulation in rats manifests itself in doses of about 0.03 to 1 mg./kg.

A compound to be particularly highlighted is $\Delta^{1,4,6}$-6-chloro - 21 - fluoro-16α,17α-dihydroxy-3,20-dioxo-pregnatriene-16,17-acetonide, which for example in the crude wadding granuloma test on rats has an $ED_{50}$ of 0.3 mg./kg. administered perorally and locally causes a pronounced anti-inflammation effect at doses of 0.003 mg./animal, and also $\Delta^{4,6}$-6-chloro - 21 - fluoro-16α,17α-dihydroxy-3,20-dioxo - pregnadiene-16,17-acetonide, which in the Clauberg test displays a maximum gestagenic effect at 0.01 mg./kg. administered subcutaneously and a pronounced ovulation-inhibiting effect at 0.1 mg./kg. administered subcutaneously.

The new compounds are therefore suitable for use as anti-inflammation agents and for controlling fertility.

The new compounds of the present application are however also intermediate products for the manufacture of other useful substances, especially of pharmacologically active compounds.

The compounds of the present application can be manufactured in a manner which is in itself known. The process of the present application is in particular characterised in that (a) the $\Delta^6$-6-fluoro or -chloro group is introduced into a compound of formula

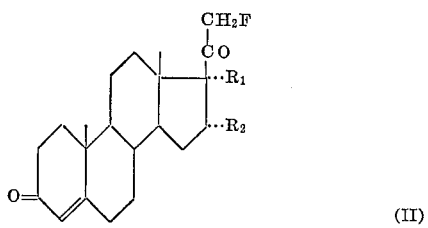

wherein $R_1$ and $R_2$ have the significance indicated for Formula I or (b) a hydroxyl group is introduced in the 16α-position in compounds of formula

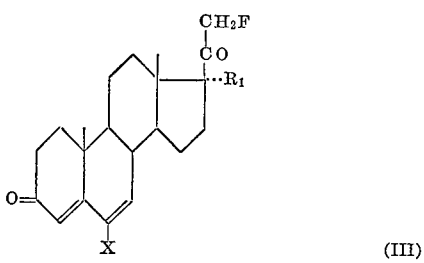

or in their 1-dehydro derivatives, wherein X and $R_1$ have the significance indicated for Formula I, and that, if desired, the following are carried out in resulting compounds, in optional sequence: a further double bond is introduced into the 1,2-position, esterified hydroxyl groups are liberated or ketals are split and/or 16,17-diols are converted into their 16- or 17-monoesters or 16- or 17-monoethers or into the 16,17-diesters or 16,17-diethers or into the 16,17-ketals.

According to the above method (a), for example, either a 6,7-double bond is first introduced and the 6-chlorine or fluorine atom introduced in a second step, or conversely the halogen atom is first introduced, followed by the double bond, the processes being carried out in a manner which is in itself known. In order to introduce the 6,7-double bond into compounds of Formula II, these compounds are treated in a manner which is in itself known, for example with a quinone which exerts a dehydrogenating action, such as chloranil, in tert.-butanol or amyl alcohol, or dichlorodicyanobenzoquinone in the presence of hydrochloric acid, or the 3-enol ether of the compound of Formula II is halogenated and hydrogen halide is eliminated from the 6-halogen derivatives, for example by means of calcium carbonate or lithium carbonate in the presence of a lithium halide in dimethylformamide.

In order to introduce the 6-fluorine or chlorine atom into the $\Delta^{4,6}$-pregnadienes thus obtained, the latter are converted into the corresponding 6α,7α-epoxides in a manner which is in itself known, for example by means of monoperphthalic acid, and the epoxides are treated with hydrofluoric or hydrochloric acid or agents which release these, and the 7α-hydroxy-6β-halogen-$\Delta^4$-3-ketones which may be obtained as intermediate products are dehydrated. Using concentrated hydrofluoric or hydrochloric acids in suitable solvents, such as for example lower aliphatic carboxylic acids, such as glacial acetic acid or propionic acid, or ketones, such as acetone, chlorinated hydrocarbons, such as chloroform or methylene chloride, or finally ethers, such as for example tetrahydrofurane, the $\Delta^6$-6-halogen derivatives are directly obtained from the epoxides mentioned. On treating the 6α,7α-epoxides with agents which release hydrogen halide acid, the 7α-hydroxy-6β-halogen compounds are obtained. 7α-hydroxy-6β-fluoro compounds are also obtained if the epoxides are treated with hydrofluoric acid in tetrahydrofurane. From the 7α-hydroxy-6β-halogen compounds, the $\Delta^6$-6-halogen compounds can be obtained by treatment with hydrogen halide acids in a lower aliphatic carboxylic acid, for example glacial acetic acid.

It is possible, as already mentioned above, first also to manufacture 6α- or 6β-fluoro or -chloro derivatives of the $\Delta^4$-3-keto compounds of Formula II and subsequently to introduce the 6,7-double bond. If 1,2-unsaturated compounds are desired, it will be possible also to couple the 1,2-dehydrogenation simultaneously with the 6,7-dihydrogenation, in a manner which is in itself known.

The 6-halogen derivatives of the $\Delta^4$-3-ketones can be manufactured in a known manner, for example in the case of the 6-chloro compounds by treatment of the 3-enol-ethers with derivatives of hypochlorous acid, especially N-chlor-amides or -imides, such as with chlorosuccinimide or chloracetamide, in a suitable solvent, for example acetone or dioxane, optionally in the presence of sodium acetate and glacial acetic acid. 6-fluoro or -chloro compounds can for example be obtained by treating the 5,6-epoxides of the ketals with hydrogen fluoride or hydrogen chloride and splitting the ketal group.

According to a further variant, the $\Delta^4$-3-ketones of Formula II can be converted into ketals, preferably the 3-ethyleneketals, and chlorine or phenyl iodosodichloride can be allowed to act on these. Halogenated hydrocarbons, such as carbon tetrachloride, or dimethylformamide, optionally in the presence of a catalyst, such as antimony trichloride, are for example used as solvents for this purpose. The 5,6-dichloro-3-ketals are thereby first produced, and are converted by the action of an acid, especially hydrochloric acid, optionally in the presence of acetic acid, into the $\Delta^4$-3-oxo-6-chloro compounds.

The dehydrogenation in the 6-position and optionally in the 1-position can preferably be achieved with a quinone exerting a dehydrogenating effect. In the case of the 6-dehydrogenation it is also possible to allow manganese dioxide to act on the 3-enol derivatives.

Quinones exerting a dehydrogenating effect, for the dehydrogenation according to the process, are, for example, chloranil and 2,3-dichloro-5,6-dicyano-1,4-benzoquinone. When using the former, a $\Delta^{4,6}$-pregnadiene or a $\Delta^{1,4,6}$-pregnatriene of Formula I is obtained as the final substance, depending on the reaction temperature.

Thus $\Delta^{4,6}$-pregnadienes are obtained when working in boiling xylene whilst when working in boiling n-amyl alcohol mainly $\Delta^{1,4,6}$-pregnatrienes are obtained.

According to method (b), a hydroxyl group is introduced in a manner which is in itself known into the 16α-position of compounds of Formula III, this being preferably achieved microbiologically. Cultures of micro-organisms are used which are capable of introducing a 16α-hydroxyl group into a steroid, such as, for example, those of the type *Streptomyces roseochromogenus*, or corresponding enzymes.

In the compounds obtained according to the described processes (a)–(b), which are saturated in the 1,2-position, a further double bond can be introduced into the 1,2-position. This can for example take place by the action of chloranil and especially of 2,3-dichloro-5,6-dicyano-1,4-benzoquinone under the reaction conditions described above or also by the action of selenium dioxide in a tertiary alcohol, for example amyl alcohol.

The esterification or etherification as well as ketalisation of the 16- and/or 17-hydroxyl groups, in accordance with the process, is also carried out in a manner which is in itself known. The steroid alcohols are for example reacted with reactive functional derivatives of acids, especially those mentioned above, such as anhydrides or acid halides, preferably in the presence of a tertiary base such as pyridine. Amongst the etherification methods, those which avoid alkaline conditions are preferably used. In particular, tetrahydropyranyl-ethers are manufactured. In order to manufacture the 16,17-ketals, for example the acetonides or cyclopentanone-ketals or cyclohexanone-ketals, the starting compounds are reacted with the appropriate ketones in the presence of an acid, such as hydrochloric acid, perchloric acid or a sulphonic acid, for example p-toluenesulphonic acid, in a suitable solvent, such as a hydrocarbon or chlorinated hydrocarbon, an amide, such as dimethylformamide or an alcohol. The formation of the ketals can however also be achieved by reaction of the 16,17-diols with ketals of the particular ketones, such as for example the dimethylketals or diethylketals.

The liberation of esterified hydroxyl groups in the 16- or 17-position, according to the process, which may have to be carried out, or the splitting of ketals, takes place through acid saponification, for example through the action of hydrochloric acid in methanol.

The starting substances for the process of the present application can be manufactured in a manner which is in itself known. Preferably, the starting compounds of the above Formula II are for example manufactured by converting a compound of formula

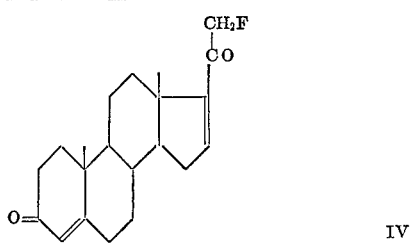

IV into the corresponding 16,17-saturated 16,17-dihydroxy compound or an ester thereof and, if desired, liberating esterified or etherified hydroxyl groups or splitting ketals and/or converting compounds which may be obtained having at least one free hydroxyl group in the 16,17-position into their 16- or 17-monoesters or 16- or 17-monoethers or into the 16,17-diesters or 16,17-diethers or into the 16,17-ketals.

The 16,17-dehydro compound of which the formula has been given above can, in turn, advantageously be manufactured according to the process claimed in our Swiss application No. 241/70 of Jan. 9, 1970. This process consists in reacting a steroid of the following partial formula

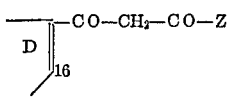

wherein Z denotes hydrogen or an esterified carboxyl group, with an agent which transfers diazo groups, reacting the resulting 21-diazo-20-ketone of partial formula

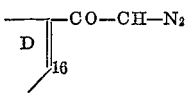

with hydrogen fluoride, and, if desired, at any desired stage converting functionally modified hydroxyl groups into free hydroxyl groups or functionally modifying free hydroxyl groups. Diazo-transferring agents are primarily sulphonyl-azides, for example p-tosyl-azide or p-carboxyphenylsulphonyl-azide. The reaction with these agents is preferably carried out in the presence of a base, for example strong organic bases, such as triethylamine, or inorganic bases, such as sodium hydride, and the reaction is effected in a hydrocarbon, such as benzene or toluene, chloroform or methylene chloride. The reaction of the resulting diazoketone with hydrogen fluoride is carried out in a solvent towards which the diazo group is inert, for example a tertiary alcohol. Starting, for example, from $\Delta^{5,16}$-3$\beta$-acetoxy - 20 - oxo-pregnadiene, $\Delta^{5,16}$-3$\beta$-hydroxy-20-oxo-21-fluoro-pregnadiene can be manufactured according to this method in good yield, and this is next oxidised in the 3-position according to Oppenauer and subsequently reacted with osmium tetroxide to give the $\Delta^4$-16,17-dihydroxy-3,20-dioxo-21-fluoro-pregnene.

It is also possible, in a known manner, only to introduce one 17-hydroxy group into the abovementioned 16,17-dehydro compound of Formula 13 and compounds are thus obtained into which the $\Delta^6$-6-chloro or $\Delta^6$-fluoro group can be introduced in a known manner, for examples as described above for the processes of the present application. The compounds thus obtained are then starting substance for the process discussed above under (b).

The 6-dehydro derivatives of the compounds of the above Formula II are not only important as intermediates for the manufacture of the compounds of the Formula I, but are themselves pharmacologically active products and also pertain to the following invention.

Thus they have besides a remarkable antiinflammatory action also a high gestangenic and above all an antiovulatory action, as is apparent upon local or parenteral application to animals, more especially to rats regarding the antiinflammatory activity and the ovulation inhibition and rabbits as regards the gestagenic action. The present invention also includes a process for the manufacture of these compounds wherein corresponding steroids saturated in 6,7-position are dehydrogenated in 6,7-position or in derivatives corresponding to the above Formula III which are not halogenated in 6-position or their 1-dehydro derivatives, there is introduced a hydroxyl group in the 16$\alpha$-position and, if desired, in the obtained compounds the following reactions are carried out in any order of succession: a further double bond is introduced into the 1,2-position, esterified hydroxyl groups are liberated or ketals are split and/or 16,17-diols are converted into their 16- or 17-monoesters or 16- or 17-monoethers or into the 16, 17-diesters or 16,17-diethers or into the 16,17-ketals.

The compounds of the above Formula III can be manufactured from the known corresponding $\Delta^4$-3,20-dioxopregnane compounds by introduction of the $\Delta^6$-6-chloro- or $\Delta^6$-6-fluoro group, again, for example, in the manner described above.

The invention also relates to those embodiments of the process in which one starts from a compound obtainable as an intermediate product at any stage and carries out the missing steps, or in which a starting substance is formed under the reaction conditions.

The present invention also relates to the manufacture of pharmaceutical preparations for use in human or veterinary medicine, which contains the new pharmacologically active substances of the present application, described above, as active substances together with a pharmaceutical excipient. Possible excipients are organic or inorganic substances wihch are suitable for enteral, for example oral, parenteral or topical administration. Possible substances for forming the excipients are those which do not react with the new compounds, such as for example water, gelatine, lactose, starch, magnesium stearate, talc, vegetable oils, benzyl alcohols, gum, polyalkylene glycols, white petroleum jelly, cholesterol and other known medicinal excipients. The pharmaceutical preparations can be in the solid form, for example as tablets, dragées or capsules, or in a liquid or semi-liquid form as solutions, suspensions, emulsions, ointments or creams. These pharmaceutical preparations are optionally sterilised and/or contain auxiliary substances, such as preservatives, stabilisers, wetting agents or emulsifiers, salts for regulating the osmotic pressure or buffers. They can also contain yet further therapeutically valuable substances. The new compounds can also serve as starting products for the manufacture of other valuable compounds.

The comopunds of the present application can also be used as feedstuff additives.

The invention is described in more detail in the examples which follow.

EXAMPLE 1

Hydrochloric acid is passed for 15 minutes into a mixture of 400 ml. of dioxane, 10 g. of 3,20-doixo-16$\alpha$,17$\alpha$-dihydroxy-21-fluoro-$\Delta^4$-pregnene-16,17-acetonide and 7 g. of 2,3-dichloro-5,6-dicyano-benzoquinone, whilst stirring and cooling with water. After a further 30 minutes the mixture is filtered and the residue rinsed with toluene, after which the filtrate is washed with water, dried and evaporated in vacuo. The residue is recrystallised from a methylene chloride-ether mixture, whereby 3,20-dioxo-16α,17α-dihydroxy - 21 - fluoro-Δ$^{4,6}$-pregnadiene-16,17-acetonide of melting point 256–257.5° C. is obtained.

11.53 g. of 86% strength m-chloroperbenzoic acid are added, with stirring, to a solution of 11.53 g. of the diene obtained above in 720 ml. of methylene chloride. After 24 hours the mixture is diluted with toluene, washed with 2 N sodium hydroxide solution and water, dried and evaporated in vacuo. The residue, dissolved in methylene chloride, is filtered through 200 g. of aluminium oxide (activity II), rinsing with 6 litres of toluene-ethyl acetate (9:1) mixture. After evaporating the eluate in vacuo, the residue is recrystallised from a methylene chloride-ether mixture. 7.01 g. of the 3,20-dioxo-6,7-epoxy-16α,17α-dihydroxy - 21-fluoro-Δ$^4$-pregnene-16,17-acetonide thus obtained are dissolved in 700 ml. of chloroform, after which hydrochloric acid is passed in, whilst cooling with ice and stirring, until saturation is reached, and the mixture is subsequently left to stand for 6 hours at room temperature. It is then poured onto 1.2 litres of saturated sodium hydrogen carbonate solution whilst stirring, the solid is separated off and post-extracted with methylene chloride and the filtrate is washed with water, dried and evaporated in vacuo. The residue, dissolved in toluene, is filtered through 210 g. of aluminium oxide (activity II), rinsing with 9 litres of toluene. Recrystallisation from methylene chloride-ether of the residue of the filtrate evaporated in vacuo yields 3,20-dioxo-6-chloro-16α,17α-dihydroxy - 21-fluoro-Δ$^{4,6}$-pregnadiene-16,17-acetonide of melting point 238–241° C.

EXAMPLE 2

A mixture of 1.6 g. of 3,20-dioxo-6-chloro-16α,17α-dihydroxy-21-fluoro-Δ$^{4,6}$-pregnadiene-16,17-acetonide, 1.6 g. of 2,3 - dichloro-5,6-dicyano-benzoquinone and 32 ml. of dioxane is boiled for 22 hours under reflux, in a stream of nitrogen. The solid is filtered off, rinsed with toluene and methylene chloride and repeatedly washed with 2 N sodium hydroxide solution and water. After drying the filtrate and evaporating in vacuo, the residue, dissolved in methylene chloride, is filtered through 50 g. of aluminium oxide (activity II), rinsing with 1.6 litres of a toluene-ethyl acetate (4:1) mixture. Crystallisation from methylene chloride-ether of the residue of the filtrate evaporated in vacuo yields 3,20 - dioxo-6-chloro-16α,17α-dihydroxy-21-fluoro-Δ$^{1,4,6}$-pregnatriene-16,17-acetonide of melting point 240.5–242° C.

EXAMPLE 3

.5 g. of 2,3-dichloro-5,6-dicyano-benzoquinone is added with stirring to a mixture of 10, 14 g. of 3,20-dioxo-16α,17α-dihydroxy - 21 - fluoro - Δ$^4$ - pregnadiene-16,17-cyclopentanonide and 300 ml. of a 2 N solution of hydrochloric acid in dioxan, while rinsing with 20 ml. of dioxan. After 30 minutes the batch is filtered and the filter residue is washed with wtaer, 1%-sodium hydroxide solution and water, dried and evaporated in vacuo. The residue is taken up in toluene and is filtered through 100 g. of Florisil while rinsing with 3 l. of toluene-ethyl acetate (4:1) mixture. The filtrates are evaporated in vacuo and there is thus obtained the 3,20-dioxo-16α,17α-dihydroxy-21 fluoro-Δ$^{4,6}$-pregnadiene-16,17-cyclopentanonide, which is recrystallized from methylene chloride-ether and melts at 209–214° C.

5.9 g. of 86% M chloro-perbenzoic acid is added to a stirred solution of the above obtained diene in 350 ml. of methylene chloride. After having been allowed to stand for 24 hours at room temperature the mixture is diluted with toluene, the toluene phase is washed with 2 N sodium hydroxide, dried and evaporated in vacuo. The crude 3,20-dioxo-6,7-epoxy-16α,17α-dihydroxy-21-fluoro-Δ$^4$-16,17-cyclopentanonide is diluted in 590 ml. of chloroform and hydrogen chloride is introduced until saturation. The mixture is allowed to stand at room temperature for 6 hours and is then diluted with methylene chloride. The organic phase is washed with saturated sodium bicarbonate solution and water, dried and evaporated to dryness. The residue is chromatographed on 250 g. of Florisil. From the fractions eluted with toluene-ethyl acetate (49:1)-mixture there is obtained the 3,20-dioxo-6-chloro-16α,17α-dihydroxy - 21 - fluoro-Δ$^{4,6}$,-pregnadiene 16α,17α-cyclopentanonide which after having been recrystallized from methylene-chloride-ether melts at 233–234°.

EXAMPLE 4

A mixture of 1.6 g. 3,20-dioxo-6-chloro-16α,17α-dihydroxy-21-fluoro-Δ$^{4,6}$-pregnadiene 16α,17α, acetonide and 54 ml. of 90%-formic acid is allowed to stand for 22 hours in a bath of 42°. The mixture is then evaporated in vacuo, the residue is dissolved in toluene and again evaporated in vacuo. A mixture of 90 ml. of methanol, 2.7 ml. of 60% perchloric acid and 27 ml. of tetrahydrofuran is added to the residue. The mixture is stirred for 15 hours at room temperature and is then poured onto water, extracted with methylene chloride, washed with water, dried and evaporated in vacuo. Upon recrystallization of the residue from methylene chloride-ether the 3,20-dioxo-6-chloro-16α-17α-dihydroxy - 21 - fluoro-Δ$^{4,6}$-pregnadiene melting at 212°–214° is obtained.

EXAMPLE 5

The starting compound used in Example 1 can be prepared as follows:

A solution of 45 grams of 3β-hydroxy-20-oxo-21-fluoro-Δ$^{5,16}$-pregnadiene and 48 grams of aluminium isopropylate in 1.5 litres of toluene and 360 ml. of cyclohexanone is boiled for two hours in a current of nitrogen. After being cooled the solution is poured onto a saturated solution of Rochelle salt, and extracted several times with toluene. The organic solutions are washed with a saturated solution of Rochelle salt, dried and evaporated in vacuo, and then the high-boiling constituents are distilled off at 80° C. in a high vacuum. By chromatography of the residue on 2 kg. of Florisil there is obtained from the fractions eluted with a mixture of toluene and ethyl acetate (9:1) 3,20-dioxo-21-fluoro-Δ$^{4,16}$-pregnadiene, which melts at 163.5–165° C. after recrystallisation from a mixture of methylene chloride, ether and petroleum ether.

To a solution of 7 grams of the resulting 3,20-dioxo-21-fluoro-Δ$^{4,16}$-pregnadiene in 100 ml. of benzene and 10 ml. of pyridine there is added, while cooling with ice, 5.8 grams of osmium tetroxide, and the whole is allowed to stand for 14½ hours at room temperature. The mixture is then poured onto a solution of 89.5 grams of sodium sulphite and 89.5 grams of potassium hydrogen carbonate in 875 ml. of water and 575 ml. of methanol, while rinsing out with 100 ml. of benzene. After stirring the mixture for 5 hours, there are added 3.75 litres of chloroform, and the whole is stirred for 30 minutes. It is then separated and extracted again twice with chloroform. The organic phases are washed with a semi-saturated solution of sodium chloride, dried and evaporated in vacuo. After recrystallising the residue from the mixture of methylene chloride and acetone, the crystallisate in solution in methylene chloride is filtered through 100 grams of Florisil, while after-washing with 3 litres of a mixture of toluene and ethyl acetate (4:1). The eluate is evaporated in vacuo, and the residue is crystallised from a mixture of methylene chloride, methanol and ether to yield 3,20-dioxo-16α,17α-dihydroxy-21-fluoro-Δ$^4$-pregnene. After being recrystallised again it melts at 220.5–221.5° C.

To a boiling solution of 38.32 grams of 3,20-dioxo-16α,17α-dihydroxy-21-fluoro-Δ$^4$-pregnene in 9.5 litres of acetone there are added 38 ml. of concentrated hydrochloric acid. After being boiled for 3 minutes, the mixture is allowed to stand at room temperature for 21 hours. It is then poured onto 20 litres of a semi-saturated solution of sodium hydrogen carbonate, and extracted several times with toluene. The organic solutions are washed with water, dried, and evaporated in vacuo. By recrystallising the residue from a mixture of methylene chloride and ether, with the addition of a small amount of pyridine, there is obtained 3,20-dioxo-16α,17α-dihydroxy-21-fiuoro-$\Delta^4$-pregnene-16,17-acetonide melting at 260–263.5° C.

EXAMPLE 6

The starting compound used in Example 3 can be obtained as follows:

0.5 ml. of 70% perchloric acid is added to a stirred mixture of 10 g. of 3,20-dioxo-16α,17α-dihydroxy-21-fluoro-$\Delta^4$-pregnene and 100 ml. of cyclopentanone. After 20 minutes complete solution has taken place. After further 80 minutes the solution is poured onto 200 ml. of saturated sodium bicarbonate solution, extracted with methylene chloride, washed with water, dried and evaporated in vacuo. The residue is taken up in toluene-ethyl acetate (4:1) mixture, filtered through 100 g. of Florisil while rinsing with the same mixture of solvents. The 3,20-dioxo-16α,17α-dihydroxy-21-fluoro - $\Delta^4$ - pregnene-16,17-cyclopentanonide is obtained from the evaporation residue of the filtrate. After recrystallization from methylene-chloride-ether it melts at 218–229°.

EXAMPLE 7

1.18 g. of 3,20-dioxo-6,21-difluoro-16α-acetoxy-17α-hydroxy-$\Delta^{4,6}$-pregnadiene are dissolved in a mixture 270 ml. of acetone, 30 ml. of methanol and 1, 2 ml. of concentrated hydrochloric acid and the whole is allowed to stand for 7 days at room temperature. The mixture is then poured onto 100 ml. of saturated sodium bicarbonate solution and 200 ml. of saturated sodium chloride solution extracted several times with methylene chloride. The organic solutions are washed with water, dried and evaporated in vacuo, whereupon the residue is taken up in a mixture of toluene and ethyl acetate (9:1), and filtered through 30 g. of aluminium oxide (activity II) while rinsing with 500 ml. of the same solvent mixture. Upon evaporation of the filtrate in vacuo the residue is recrystallized from methylene-chloride-ether and there is obtained the 3,20-dioxo-6,21-difluoro-16α,17α-dihydroxy-$\Delta^{4,6}$-pregnadiene 16,17-acetonide melting melting at 235–237°.

The 3,20 - dioxo - 6,21 - difluoro - 16α - actoxy-17α-hydroxy-$\Delta^{4,6}$,-pregnadiene used as starting material is obtained as follows: 3,20-dioxo-16α,17α-oxido-21-fluoro-$\Delta^4$-pregnene is reacted with o-formic acid ethyl ester in the presence of p-toluene sulfonic acid and there is obtained the 3 - ethoxy-16α,17α-oxido-20-oxo-21fluoro-$\Delta^{3,5}$-pregnadiene of melting point 186–191°. When this compound is reacted with perchloryl fluoride in lutidine a mixture of 3,20 - dioxo-6β,21-difluoro-16α,17α-oxido-$\Delta^4$-pregnene of melting point 242–243° and 3,20-dioxo-6α,21-difluoro-16α,17α - oxido - $\Delta^4$ - pregnene of melting point 260.5–264° is obtained. This mixture is converted by treatment with o-forminc acid ethyl ester in the presence of p-toluene sulfonic acid into the 3-ethoxy-6,21-difluoro-16α, 17α - oxido - 20 - oxo - $\Delta^{3,5}$ - pregnadiene, which on oxydation with manganese dioxide in aqueous acetic acid gives a mixture of 3,6,20-trioxo-16α,17α-oxido-21-fluoro-$\Delta^4$-pregnene of melting point 225–229° and 3,20–dioxo-6,21-difluoro-16α,17α-oxido-$\Delta^{4,6}$-pregnadiene of melting point 243–248°.

The obtained compound is reacted with hydrogen chloride in chloroform and there is thus obtained the 3,20-dioxo - 6,21 - difluoro - 16β - chloro - 17α-hydroxy-$\Delta^{4,6}$-pergnadiene which upon acetylation gives the 3,20-dioxo-6,21 - difluoro - 16β - chloro - 17α - acetoxy-$\Delta^{4,6}$-pregnadiene of melting point 191–193°. On treatment with sodium acetate in acetic acid the 3,20-dioxo-6,21-difluoro-16α - acetoxy - 17α - hydroxy - $\Delta^{4,6}$-pregnadiene is obtained.

What is claimed is:
1. A compound, which is $\Delta^{4,6}$-6,21-difluoro-16α,17α-dihydroxy-3,20-dioxo-pregnadiene.
2. A compound, which is $\Delta^{1,4,6}$-6,21-difluoro-16α,17α-dihydroxy-3,20-dioxo-pregnadiene.
3. A compound, which is $\Delta^{1,4,6}$-6-chloro-21-fluoro-16α, 17α-dihydroxy-3,20-dioxo-pregnadiene.
4. A compound, which is the 16,17-acetonide of $\Delta^{4,6}$-6, 21 - difluoro - 16α,17α - dihydroxy - 3,20-dioxopregnadiene.
5. A compound, which is the 16,17-acetonide of $\Delta^{1,4,6}$-6,21-difluoro-16α,17α-dihydroxy-3,20-dioxopregnadiene.
6. A compound, which is the 16,17-acetonide of $\Delta^{1,4,6}$-6 - chloro - 21 - fluoro - 16α,17α-dihydroxy-3,20-dioxo-pregnadiene.
7. A compound, which is the cyclopentanonide $\Delta^{1,4,6}$-6 - chloro - 21 - fluoro - 16α,17α-dihydroxy-3,20-dioxo-pregnadiene.
8. A compound, which is $\Delta^{4,6}$-21-fluoro-16α,17α-dihydroxy-3,20-dioxo-pregnadiene.
9. A compound, which is the acetonide of $\Delta^{4,6}$-21-fluoro - 16α,17α - dihydroxy - 3,20 - dioxo pregnadiene.
10. A compound, which is the cyclopentanonide of $\Delta^{4,6}$ - 21 - fluoro - 16α,17α - dihydroxy - 3,20 - dioxo-pregnadiene.

References Cited
UNITED STATES PATENTS

| 3,579,508 | 5/1971 | Heller et al. | 260—239.55 |

FOREIGN PATENTS

| 1,201,342 | 9/1965 | Germany | 260—397.45 |
| 1,245,945 | 7/1967 | Germany | 260—397.45 |

ELBERT L. ROBERTS, Primary Examiner

U.S. Cl. X.R.

260—239.55, 397.47, 397.4; 424

PO-1050
(5/69)

UNITED STATES PATENT OFFICE
CERTIFICATE OF CORRECTION

Patent No. 3,763,145          Dated October 2, 1973

Inventor(s) Georg Anner et al

It is certified that error appears in the above-identified patent and that said Letters Patent are hereby corrected as shown below:

Column 7, Example 3,
    line 2, delete "10, 14 g." and substitute --- 10.14 g. ---;   line 3, delete "pregnadiene" and substitute --- pregnene ---;   line 23, after "$\Delta^4$-" insert --- pregnene- ---.

Column 9, Example 7, line 8, before "extracted" insert --- ; and ---;   line 17, after "acetonide" delete "melting"(first occurrence);   line 19, delete "actoxy" and substitute --- acetoxy ---.

Column 10, line 2, delete "forminc" and substitute --- formic ---;   lines 23, 25, 30, 33 and 36, in each delete "pregnadiene" and substitute --- pregnatriene ---;   line 26, delete "$\Delta^{4,6}$-" and substitute --- $\Delta^{4,6}$- ---.

Signed and sealed this 25th day of June 1974.

(SEAL)
Attest:

EDWARD M. FLETCHER, JR.
Attesting Officer

C. MARSHALL DANN
Commissioner of Patents